(12) United States Patent
Sherwood et al.

(10) Patent No.: US 7,554,791 B2
(45) Date of Patent: Jun. 30, 2009

(54) METHOD AND APPARATUS FOR ELECTRICALLY ISOLATING CAPACITOR ELECTRODES USING SEPARATOR

(75) Inventors: Gregory J. Sherwood, North Oaks, MN (US); Brian V. Waytashek, Lino Lakes, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 161 days.

(21) Appl. No.: 11/688,513

(22) Filed: Mar. 20, 2007

(65) Prior Publication Data

US 2007/0159768 A1 Jul. 12, 2007

Related U.S. Application Data

(63) Continuation of application No. 11/124,794, filed on May 9, 2005, now Pat. No. 7,206,191.

(51) Int. Cl.
*H01G 9/00* (2006.01)
*H01G 9/04* (2006.01)

(52) U.S. Cl. .................. 361/503; 361/508; 361/516; 29/25.03

(58) Field of Classification Search ............... 361/503, 361/508–510, 516–517, 522; 29/25.03; 607/5
See application file for complete search history.

(56) References Cited

U.S. PATENT DOCUMENTS

| 3,789,502 | A | 2/1974 | Callins et al. |
|---|---|---|---|
| 4,232,099 | A | 11/1980 | Sullivan |
| 5,142,439 | A | 8/1992 | Huggett et al. |
| 5,597,658 | A | 1/1997 | Kejha |
| 5,628,801 | A | 5/1997 | MacFarlane et al. |
| 5,660,737 | A | 8/1997 | Elias et al. |
| 5,779,891 | A | 7/1998 | Andelman |
| 5,790,368 | A | 8/1998 | Naito et al. |
| 5,930,109 | A | 7/1999 | Fishler |
| 6,110,233 | A | 8/2000 | O'Phelan et al. |
| 6,191,931 | B1 | 2/2001 | Paspa et al. |
| 6,275,729 | B1 | 8/2001 | O'Phelan et al. |
| 6,388,866 | B1 | 5/2002 | Rorvick et al. |
| 6,402,793 | B1 | 6/2002 | Miltich et al. |
| 6,413,283 | B1 | 7/2002 | Day et al. |

(Continued)

FOREIGN PATENT DOCUMENTS

JP 03296207 A2 12/1991

OTHER PUBLICATIONS

Poplett, James M., "Method and Apparatus for Interconnecting Electrodes With Partial Titanium Coating", U.S. Appl. No. 11/124,706, filed May 9, 2005, 46 Pages.

(Continued)

*Primary Examiner*—Eric Thomas
(74) *Attorney, Agent, or Firm*—Schwegman, Lundberg & Woessner, P.A.

(57) ABSTRACT

The present subject matter includes a capacitor stack having at least one cathode layer, and at least one anode layer. Separator paper is shaped and sized to separate the anode and the cathode and resist breakdown. The capacitor stack is compact, and is adapted for use in compact devices. For example, the capacitor stack is adapted for use in cardiac rhythm management devices which are implanted.

20 Claims, 8 Drawing Sheets

U.S. PATENT DOCUMENTS

| | | |
|---|---|---|
| 6,509,588 B1 | 1/2003 | O'Phelan et al. |
| 6,522,525 B1 | 2/2003 | O'Phelan et al. |
| 6,556,863 B1 | 4/2003 | O'Phelan et al. |
| 6,560,089 B2 | 5/2003 | Miltich et al. |
| 6,571,126 B1 | 5/2003 | O'Phelan et al. |
| 6,603,653 B2 | 8/2003 | Matsuoka et al. |
| 6,603,654 B2 | 8/2003 | Rorvick |
| 6,648,928 B2 | 11/2003 | Nielsen et al. |
| 6,687,118 B1 | 2/2004 | O'Phelan et al. |
| 6,699,265 B1 | 3/2004 | O'Phelan et al. |
| 6,709,946 B2 | 3/2004 | O'Phelan et al. |
| 7,206,191 B2 | 4/2007 | Sherwood et al. |
| 7,224,575 B2 | 5/2007 | Sherwood |
| 7,352,560 B2 | 4/2008 | Poplett et al. |
| 2002/0071240 A1 | 6/2002 | Rorvick et al. |
| 2002/0108221 A1 | 8/2002 | Miltich et al. |
| 2003/0011967 A1 | 1/2003 | Nielsen et al. |
| 2003/0013007 A1 | 1/2003 | Kaun |
| 2003/0064285 A1 | 4/2003 | Kawamura et al. |
| 2004/0174658 A1 | 9/2004 | O'Phelan et al. |
| 2004/0220627 A1 | 11/2004 | Crespi et al. |

OTHER PUBLICATIONS

Sherwood, Gregory J., "Method and Apparatus for High Voltage Aluminum Capacitor Design", U.S. Appl. No. 11/182,707, filed Jul. 15, 2005, 239 Pages.

METHOD AND APPARATUS FOR ELECTRICALLY ISOLATING CAPACITOR ELECTRODES USING SEPARATOR

CROSS REFERENCE TO RELATED APPLICATIONS

This application is a continuation of U.S. patent application Ser. No. 11/124,794, filed on May 9, 2005, now issued as U.S. Pat. No. 7,206,191, the specification of which is incorporated herein by reference.

The present application is related to the following commonly assigned U.S. Patents which are incorporated by reference in their entirety: "High-Energy Capacitors for Implantable Defibrillators," U.S. Pat. No. 6,556,863, filed Oct. 2, 1998, issued Apr. 29, 2003; "Flat Capacitor for an Implantable Medical Device," U.S. Pat. No. 6,699,265, filed Nov. 3, 2000, issued Mar. 2, 2004. Additionally, the present application is related to the following Provisional U.S. Patent Application which is assigned to the same assignee and is incorporated by reference in its entirety: "Method and Apparatus for Single High Voltage Aluminum Capacitor Design," Ser. No. 60/588,905, filed on Jul. 16, 2004. The present application is related to the following commonly assigned copending U.S. Patent Application which is incorporated by reference in its entirety: "Method and Apparatus for Interconnection Cathodes with Partial Titanium Coating," Ser. No. 11/124,706, filed on May 9, 2005, now issued as U.S. Pat. No. 7,352,560.

TECHNICAL FIELD

This disclosure relates generally to capacitors, and more particularly, to method and apparatus for electrically isolating capacitor electrodes using separator.

BACKGROUND

There is an ever-increasing interest in making electronic devices physically smaller. Consequently, electrical components become more compact as technologies are improved. However, such advances in technology also bring about additional problems. One such problem involves electrical isolation of electrical subcomponents.

Electrical isolation is especially problematic in capacitors with reduced size. As capacitor layers become more complex and smaller, they are separated by less distance. This trend decreases the amount of electrical insulation available by distance separation. Decreased distance impairs breakdown resistance. In order to reduce instances of breakdown, size reduced capacitors require improved insulation designs.

Thus, there is a need in the art for improved insulation technologies for electrical devices with subcomponent layers. These technologies should be readily adapted for manufacturing. Additionally, these technologies should allow for robust interconnection technologies and should not sacrifice substantial performance of the electrical devices or their subcomponents.

SUMMARY

The above-mentioned problems and others not expressly discussed herein are addressed by the present subject matter and will be understood by reading and studying this specification.

One embodiment of the present subject matter includes an electrolytic capacitor stack disposed in a case, with the case filled with electrolyte, comprising a first substantially planar electrode having a first perimeter and a first thickness; a second substantially planar electrode having a second perimeter and a second thickness, the second thickness being from about 3 times the first thickness to about 14 times the first thickness, the second substantially planar electrode is in a stack with the first substantially planar electrode; and a first substantially planar separator having a separator perimeter and a first separator thickness from about 0.4 times the first thickness to about 1.0 times the first thickness, with the first substantially planar separator disposed between the first substantially planar electrode and the second substantially planar electrode; wherein the first perimeter is laterally disposed outside the separator perimeter along a first section of the separator perimeter and the second perimeter is laterally disposed inside the separator perimeter along the first section by approximately three times the first separator thickness.

In an additional embodiment, the present subject matter includes an electrolytic capacitor stack disposed in a case, the case filled with electrolyte, wherein the capacitor stack includes a first substantially planar electrode means having a first perimeter, and a second substantially planar electrode means having a second perimeter, with the second substantially planar electrode means is in alignment with the first substantially planar electrode means; and a first substantially planar separator means having a separator perimeter, the first substantially planar separator means disposed between the first substantially planar electrode means and the second substantially planar electrode means; wherein the first perimeter is laterally disposed outside the separator perimeter along a first section of the separator perimeter, and the separator perimeter is laterally disposed outside the second perimeter along the first section of the separator perimeter.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references may contemplate more than one embodiment. The following detailed description is, therefore, not to be taken in a limiting sense, and the scope is defined only by the appended claims, along with the full scope of legal equivalents to which such claims are entitled.

In various embodiments, flat capacitors with substantially planar electrode layers in a stack are used to power electronic devices. For example, flat capacitors are used in implantable medical devices such as an implantable cardioverter defibrillator. In various embodiments, flat capacitors build a potential between two electrodes. To prevent shorting, the electrodes are insulated from each other. In one embodiment, the electrodes are insulated from each other using a dielectric coating on one or both of the anode and the cathode. In some embodiments, an electrolyte functions as an electrochemical cathode. In some of these embodiments, a separator layer, such as paper, is used to add structure to the capacitor stack, to insulate the cathode from the anode, and/or to manage charge in the electrolyte.

Known capacitor component configurations experience breakdown in insulating the anode from the cathode when used at high voltages or in compact arrangements. In one embodiment, an anode layer has an anode perimeter, a cathode layer has a cathode perimeter, and a separator layer has a separator perimeter. In a first section along the separator perimeter, a cathode connection member extends outside the separator perimeter. Inside that first section, the anode extends inside the separator perimeter. The anode, in some embodiments, is about 0.010 inches inside the separator perimeter. In these embodiments, breakdown has been experienced in voltages over 430 volts. Specifically, areas in which the anode includes a stack of four anode layer subcomponents have suffered breakdown, but the present subject matter extends to configurations using one or more anode foils. In some examples, the breakdown manifests as arcing.

What is needed in the art are methods and structures to prevent breakdown. Specifically, what is needed is a configuration in which the anode extends at least 0.030 inches inside the separator perimeters along the first section, in various embodiments. This configuration has been shown to enable voltages which extend up to 470 volts, and higher. These problems and solutions are addressed in the present subject matter. The present subject matter includes additional solutions as well.

Figure 1A:
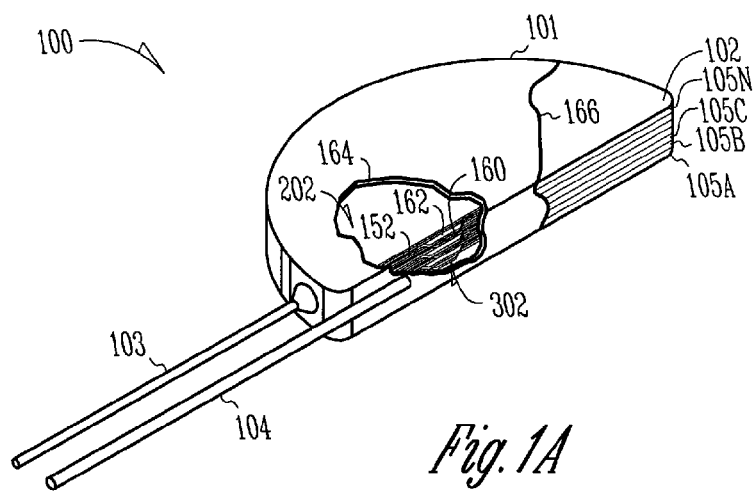
FIG. 1A is an isometric view of a flat capacitor according to one embodiment of the present subject matter.

FIG. 1A shows a flat capacitor 100 constructed according to one embodiment of the present subject matter. Although capacitor 100 is a D-shaped capacitor, in various embodiments, the capacitor is another desirable shape, including, but not limited to, rectangular, circular, oval or other symmetrical or asymmetrical shapes. Capacitor 100 includes a case 101 which contains a capacitor stack 102. In one embodiment, case 101 is manufactured from a conductive material, such as aluminum. In various embodiments, the case is manufactured using a nonconductive material, such as a ceramic or a plastic.

Capacitor 100 includes a first terminal 103 and a second terminal 104 for connecting capacitor stack 102 to an outside electrical component, such as heart monitor circuitry, including defibrillator, cardioverter, and/or pacemaker circuitry. In one example embodiment, terminal 103 is a feedthrough terminal insulated from case 101, while terminal 104 is directly connected to case 101. In various embodiments, the capacitor incorporates additional connection structures and methods. Additional connection structures and methods, such as embodiments including two or more feedthrough terminals, are described on or around pages 12-13, 59-60, 63-82 of Provisional U.S. Patent Application, "Method and Apparatus for Single High Voltage Aluminum Capacitor Design," Ser. No. 60/588,905, filed on Jul. 16, 2004, which are incorporated herein by reference in a nonlimiting sense.

Capacitor stack 102 includes one or more cathodes 302, one or more separators 152, and one or more anodes 202. These components are illustrated through break line 164 for explanation. Additionally, in some embodiments, these components are organized into capacitor elements 105a, 105b, 105c, ..., 105n, illustrated through break line 166. In various embodiments, stack 102 is formed in two steps, including a first step of stacking capacitor components into two or more elements 105a, 105b, 105c, ..., 105n, and a second step of stacking elements into a capacitor stack. Additional embodiments include forming a capacitor stack in a single step.

It should be noted that throughout the present application, matching numbers indicate similar features and/or functions. Matching numbers help to explain the subject matter, but the arbitrary nature of shapes, such as capacitor electrode shapes, is emphasized, and the matching numbers are not to be taken as limiting.

In various embodiments, each cathode 302 is a metallic foil structure. In some embodiments, the cathode is about 0.0012 inches thick. Varying examples include one cathode layer of capacitor stack 102 connected to another cathode layer using a variety of methods and structures, including welding and additional connection methods discussed herein. In some embodiments, the cathodes are coupled to conductive case 101, and terminal 104 is attached to case 101 to provide a cathode connection to outside circuitry. In some embodiments, the cathode is coupled to a feedthrough conductor extending through a feedthrough hole.

In various embodiments, a separator 152 is located between each anode 202 and cathode 302. In some embodiments, the separator includes one or more sheets of kraft paper impregnated with an electrolyte. For example, a 0.0010 inches thick separator layer may be comprised of two 0.0005 inches thick sheets of kraft paper. In the illustration, separator 152 includes an extended separator portion 162. Additionally, the illustrated cathode 302 includes an extended cathode portion 160. The extended cathode portions are useful for formation of a cathode connection. For example, in one embodiment, a connection structure is attached to each of the cathode layers. In an additional embodiment, the extended cathode portions are deformed into an abutting position, defining a cathode connection surface. Embodiments including a cathode connection surface are useful for connection of the cathodes to each other with an energy source such as a laser weld along the cathode connection surface. Embodiments including a cathode connection surface are additionally useful for connection of a cathode interconnect, such as a strip of metal abutting and connecting each cathode edge face.

In various embodiments, the extended separator portion 162 is sized to increase the distance between the anode edge face and the cathode. For example, in sections along the separator where the cathode extends past the separator, the anode extends inside the separator. In various embodiments, this reduces breakdown between the anode 202 and the cathode 302. This allows for improved operating voltages. This structure and function is discussed additionally herein.

In various embodiments, capacitor stack 102 includes one or more anodes 202. In embodiments comprised of elements, one or more of the anodes 202 of capacitor stack 102 are configured into an element. In various embodiments, an element includes one, two, three or more anode foils having a variety of anode shapes. In various embodiments, anodes can include aluminum, tantalum, hafnium, niobium, titanium, zirconium, and combinations of these metals. For example, an anode may be approximately 0.004 inches thick, and be placed adjacent other anodes, such that the anode portion of an element is a multiple of that thickness. In one example, the anode is comprised of three subcomponents which are 0.004 inches thick, defining an anode component which is 0.012 inches thick. In one embodiment, at least portions of a major surface of each anode is roughened and/or etched to increase its effective surface area. This increases the capacitive effect of the anode with reduced increase in volume. Various embodiments incorporate other compositions and/or classes of compositions.

In one embodiment, each anode is connected to the other anodes of the capacitor and coupled to feedthrough assembly 103 for electrically connecting the anode to circuitry outside the case. In some embodiments, the anodes are connected to the case and the cathodes are coupled to a feedthrough assembly. In various embodiments, both the anode and the cathode are connected to components through feedthroughs.

Figure 1B:
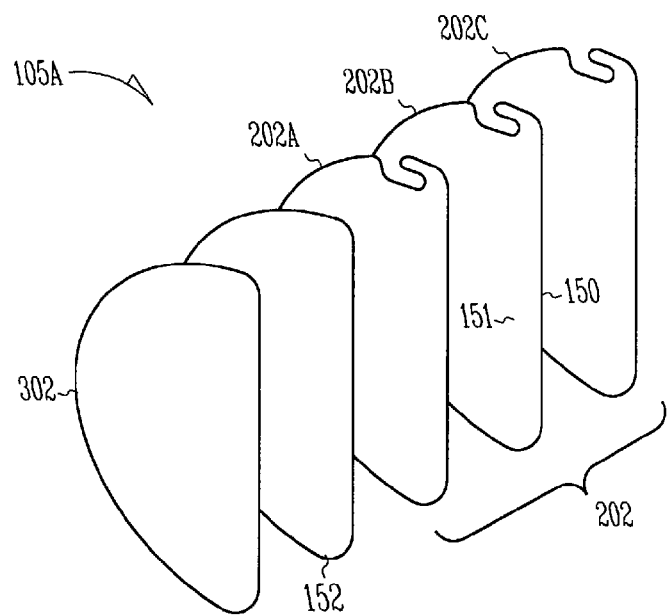
FIG. 1B is an isometric view of capacitor electrodes, according to one embodiment of the present subject matter.

FIG. 1B shows details of one example of capacitor element 105a, which is representative of capacitor elements 105b-105n. Element 105a includes a cathode 302, a separator 152, and an anode stack 202. In various embodiments, other numbers and arrangements of anodes, cathodes, and separators are utilized. Related Provisional U.S. Patent Application "Method and Apparatus for Single High Voltage Aluminum Capacitor Design," Ser. No. 60/588,905, filed on Jul. 16, 2004 includes example methods and structures on or around pages 41-50, and is incorporated herein by reference in a nonlimiting sense.

In various embodiments, cathode 302 is a foil attached to other cathodes of capacitor stack 102 and to terminal 104. In some embodiments, cathode 302 can include aluminum, tantalum, hafnium, niobium, titanium, zirconium, and combinations of these metals. Additionally, some embodiments include a cathode which has a coating. In some of these embodiments, the cathode 302 comprises a titanium coated aluminum substrate. Some embodiments include portions with the cathode coating substantially absent. In some embodiments, the coating was never added. In additional embodiments, the coating is substantially removed.

Some embodiments having a titanium coated cathode material have a higher capacitance per unit area than traditional aluminum electrolytic capacitor cathodes. Traditional cathodes which are 98% aluminum purity or higher generally have capacitance per unit area of approximately 250 $uF/cm^2$ for 30 micron thick cathode, with an oxide breakdown voltage in the 1-3 volt range. However, a cathode as described above results in a capacitance per unit area which, in some embodiments, is as high as 1000 $uF/cm^2$ or more.

Advantageously, these cathode embodiments provide a cathode which services an anode without exceeding the oxide breakdown voltage of the cathode. When using a traditional cathode to service several layers (2 or more) of anode, the cathode voltage may rise as high as 5 or more volts, which is usually greater than the breakdown voltage. When this occurs, the aluminum cathode begins to form oxide by a hydration process which extracts oxygen from the water present in the electrolyte. The reaction produces hydrogen as a byproduct which in turn has the effect of creating an internal pressure within the capacitor, in various embodiments. Embodiments having internal pressure can demonstrate an undesirable mechanical bulge in the layers of the capacitor stack, or in the case. As such, the titanium-coated cathode described above serves as a corrective mechanism for hydrogen generation.

Separator 152 is located between each anode stack 202 and cathode 302. In one embodiment, separator 152 consists of two sheets of 0.0005 inches thick kraft paper. Various embodiments are impregnated with electrolyte. In some embodiments, separator 152 includes a single sheet or three or more sheets. In various embodiments, the electrolyte can be any electrolyte for an electrolytic capacitor, such as an ethylene-glycol base combined with polyphosphates, ammonium pentaborate, and/or an adipic acid solute.

In one embodiment, each anode stack 202 is a multi-anode stack including three anode foils 202a, 202b, and 202c. In various embodiments, anode stack 202 includes one, two, three or more anode foils having a variety of anode shapes. Each anode foil has a major surface 151 and an edge face 150 generally perpendicular to major surface 151. Anodes 202a, 202b, and 202c can include aluminum, tantalum, hafnium, niobium, titanium, zirconium, and combinations of these metals, in various embodiments.

In one embodiment, anodes 202a-202c are high formation voltage anodes, which will be discussed below. In various embodiments, the anodes are medium and/or low formation variations. In one embodiment, the major surface of each anode 202a-202c is roughened or etched to increase its microscopic surface area. This increases the microscopic surface area of the foil with no increase in volume. Various embodiments use tunnel-etched, core-etched, and/or perforated-core-etched structures. Various embodiments utilize other foil compositions and classes of compositions.

Depending on which process is used to construct the anode, various surfaces are coated with a dielectric. For example, in embodiments where the anode shapes are punched from a larger sheet which has previously been coated with dielectric, only the surfaces which have not been sheared in the punching process are coated with dielectric. But if the dielectric is formed after punching, in various embodiments, all surfaces are coated. In some embodiments, anodes are punched from a larger sheet to minimize handling defects due to handling during the manufacturing process. For example, if a larger sheet is used as a starting material from which a number of anode layers are punched, machines or operators can grasp areas of the starting material which is not intended to form the final anode. Generally, in embodiments where the entire anode is not covered with dielectric, the anode is aged to restore the dielectric.

Various embodiments include a capacitor stack adapted to deliver between 7.0 Joules/cubic centimeter and 8.5 Joules/cubic centimeter. Some embodiments are adapted to deliver about 7.7 Joules/cubic centimeter. In some embodiments, the anode has a capacitance of between approximately 0.70 and 0.85 microfarads per square centimeter when charged at approximately 550 volts. In various embodiments, these ranges are available at a voltage of between about 410 volts to about 610 volts.

In various embodiments, the stack is disposed in a case, and linked with other components, a state which affects some of these values. For example, in one packaged embodiment, including a case and terminals, the energy density available ranges from about 5.3 joules per cubic centimeter of capacitor stack volume to about 6.3 joules per cubic centimeter of capacitor stack volume. Some embodiments are adapted to deliver about 5.8 joules. In various embodiments, these ranges are available at a voltage of between about 410 volts to about 610 volts.

Figure 1C:
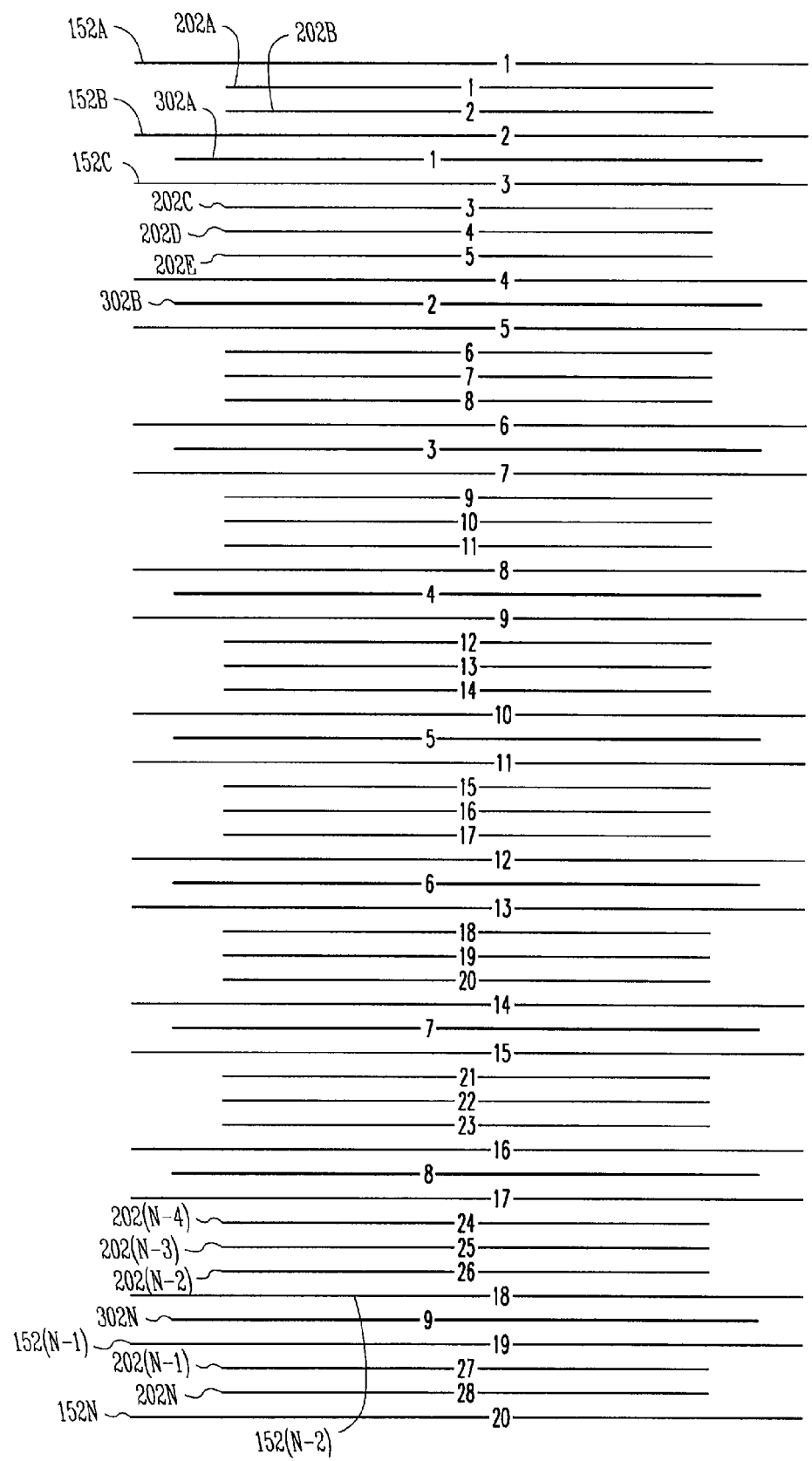
FIG. 1C illustrates a schematic of a capacitor stack, according to one embodiment of the present subject matter.

FIG. 1C illustrates a schematic of a capacitor stack, according to one embodiment of the present subject matter. Each line represents a layer adjacent at least one additional layer. Additionally, lines are numbered for reference. These numbers are not to be confused with the numbers attached to leaders. Further, it should be noted that FIG. 1C is not to scale, and size relationships inferred from the schematic should not be taken as limiting.

In various embodiments, a capacitor stack includes nine cathodes 302a, 302b, . . . , 302n, twenty separators 152a, 152b, . . . , 152n, and twenty eight anodes 202a, 202b, . . . , 202n. A single separator 152a, 152b, . . . , 152n may include one, two, or more sheets of a separator material, such as kraft paper. The illustrated configuration shows one embodiment of the present subject matter, but should not be interpreted as limiting the scope of the present subject matter. The illustration shows a combination of nine elements, with two additional separators and two additional anode layers. One way to form such a combination would be to stack eight elements including three anode layers and one element including two anode layers. The number of layers, and the number of elements, is selectable by a capacitor stack design and manufacturing process to achieve a desired capacitor power and thickness, in various embodiments.

Figure 1D:
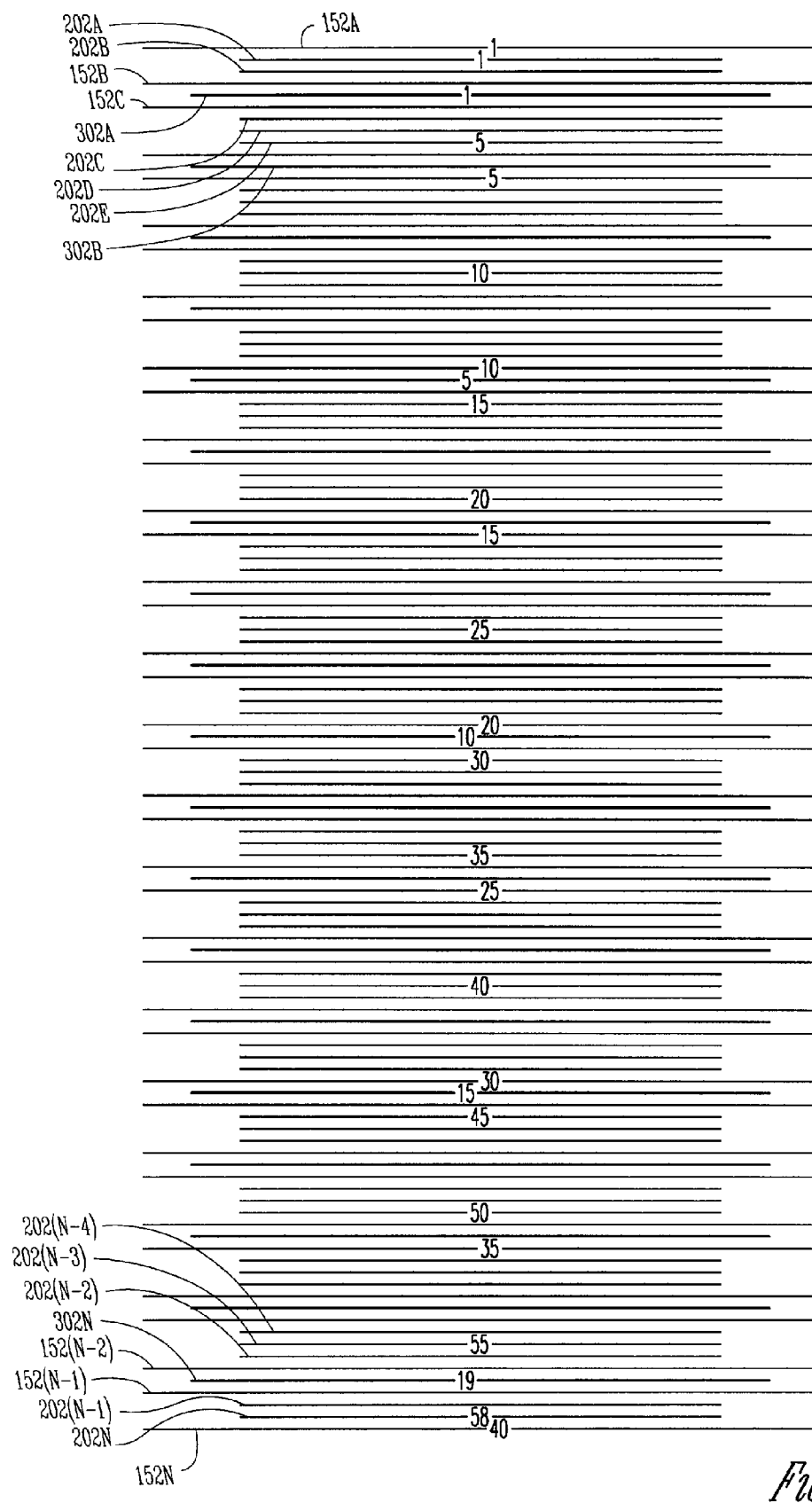
FIG. 1D illustrates a schematic of a capacitor stack, according to one embodiment of the present subject matter.

FIG. 1D illustrates a schematic of a capacitor stack, according to one embodiment of the present subject matter. Each line represents a layer abutting at least one additional layer. Additionally, each line is numbered for reference. These one or two digit numbers are not to be confused with the numbers attached to leaders. Further, it should be noted that FIG. 1D is not to scale, and size relationships inferred from the schematic should not be taken as limiting.

In various embodiments, a capacitor stack includes eighteen cathodes, twenty-two separators, and fifty eight anodes. A single separator 152a, 152b, . . . , 152n may include one, two, or more sheets of a separator material, such as kraft paper. The illustrated configuration shows one embodiment of the present subject matter, but should not be interpreted as limiting the scope of the present subject matter. The illustration shows a combination of nineteen elements, with two additional separators and two additional anode layers. One way to form such a combination would be to stack eighteen elements including three anode layers and one element including two anode layers. The number of layers, and the number of elements, is selectable by capacitor stack design and manufacturing processes to achieve a desired capacitor power and thickness, in various embodiments.

Figure 2A:
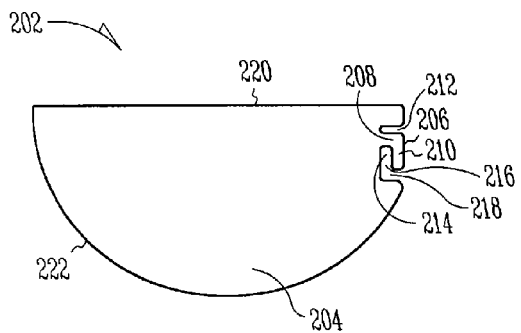
FIG. 2A is a top view of an anode for use in constructing a capacitor according to one embodiment of the present subject matter.

FIG. 2A shows an anode 202 according to one embodiment of the present subject matter. Anode 202 is shown before it is assembled into capacitor stack, such as capacitor stack 102 illustrated in example FIG. 1A. Anode 202 includes a main body portion 204 having one or more connection members 206. In one embodiment, connection member 206 includes one or more separate members attached to the anode by welding, staking, or by using another connection method and/or structure.

In various embodiments, connection member 206 is an integral portion of anode 202, and is punched, laser-cut, or otherwise shaped from the anode. In one such embodiment, portions of connection member 206 are not etched along with the rest of anode 202. For instance, a resin mask is put on portions of connection member 206 to keep those masked portions from becoming etched during the etching process. As will be discussed below, this provides that those unetched, non-porous sections make welding the edges of the anodes to each other easier.

Connection member 206 includes a proximal section 208 and distal section 210. In the embodiment of FIG. 2A, connection member 206 is an L-shaped member. However, it can also have other shapes. In one embodiment, a portion of a distal section 210 along its outer edge is unetched, as discussed above.

In one embodiment, proximal section 208 is connected to main body 204 and is defined in part by a pair of cut-out portions 212 and 214 located on opposing sides of proximal section 208. Distal section 210 is connected to a portion of proximal section 208. In one embodiment, it is integral with proximal section 208. In some embodiments, distal section 210 is attached as a separate member. In one embodiment, distal section 210 is defined in part by a cut-out portion 216 which is located between main body 204 and distal section 210, and a cut-out portion 218 which separates distal section 210 from main body 204.

In this embodiment, connection member 206 is located within the general shape or outline of anode 202. In various embodiments, connection member extends further from the main body of anode 202 or connection member 206 is more internal within the main body of anode 202.

In some embodiments, each anode in capacitor stack 102 includes a connection member such as connection member 206. In various embodiments, one or more anode foils in a multi-anode stack have a connection member 206 while the other anode foils in the multi-anode stack are connected to the anode having the connection member. For instance, in one embodiment, a three-foil anode stack includes one foil having a connection member 206 and two foils without connection members. The two foils without connection members are welded, staked, or otherwise attached to the foil having the connection member.

Figure 2B:
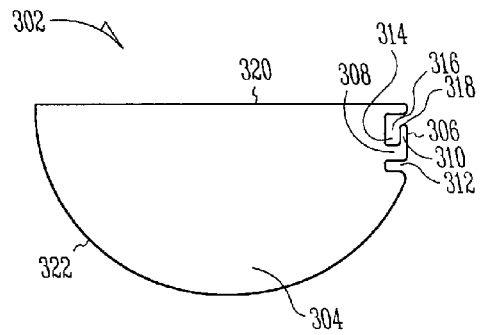
FIG. 2B is a top view of a cathode for use in constructing a capacitor according to one embodiment of the present subject matter.

FIG. 2B shows a cathode 302 according to one embodiment of the present subject matter. Cathode 302 is shown before it is assembled into capacitor stack, such as the capacitor stack 102 shown in FIG. 1. Cathode 302 includes a main body portion 304 having one or more connection members 306. In one embodiment, connection member 306 is an integral portion of cathode 302, and is punched, laser-cut, or otherwise shaped from the cathode. In one embodiment, connection member 306 includes one or more separate members attached to the cathode by welding, staking, or other connection method. Related application "Method and Apparatus for Single High Voltage Aluminum Capacitor Design," Ser. No. 60/588,905, filed on Jul. 16, 2004 discusses additional methods of joining on or around pages 13-29 which are incorporated here by reference.

In various embodiments, portions of connection member 306 are not coated in, for example, a titanium coating. For instance, in one embodiment, a titanium etchant is applied to portions of connection member 306 to substantially remove titanium coating from those portions. In some embodiments, the cathode connection member 306 is first welded to one or more anode connection members 206, and is then cut away from the respective main cathodic body 304. As such, in use there are portions of the cut-away cathode connected to an anode. Various embodiments remove a coating as is discussed in related application "Method and Apparatus for Interconnection Cathodes with Partial Titanium Coating," Ser. No. 11/124,706, filed on May 9, 2005 (Attorney Docket No. 279.827US1) at or around pages 8-25, incorporated herein by reference in a nonlimiting sense.

Welding performed to anodes can damage dielectric boundaries, requiring post-welding aging. In cases where portions of at least one cut-away cathode are attached to the anode, it is beneficial to avoid weld compositions including titanium. Titanium is derived from the cut-away cathode. Titanium in the weld can reduce the effectiveness of oxide growth during aging. By limiting the amount of titanium in the weld, the effectiveness of aging is improved, which can result in improved capacitor performance. Thus, cut-away cathodes with titanium substantially absent from welding areas benefit capacitor performance during aging and overall.

In one embodiment, connection member 306 includes a proximal section 308 and a distal section 310. In the embodiment of FIG. 2B, connection member 306 is an L-shaped member. However, in some embodiments it has another shape.

In one embodiment, proximal section 308 is connected to main body 304 and is defined in part by a pair of cut-out portions 312 and 314 located on opposing sides of proximal section 308. Distal section 310 is connected to a portion of proximal section 308. In one embodiment, it is integral with proximal section 308. In some embodiments, distal section 310 is attached as a separate member. In one embodiment, distal section 310 is defined in part by a cut-out portion 316 which is located between main body 304 and distal section 310, and a cut-out portion 318 which separates distal section 310 from main body 304.

In this embodiment, connection member 306 is located within the general shape or outline of cathode 302. In various embodiments, connection member 306 extends further from the main body of cathode 302 or connection member 306 is more internal within the main body of cathode 302.

Figure 3A:
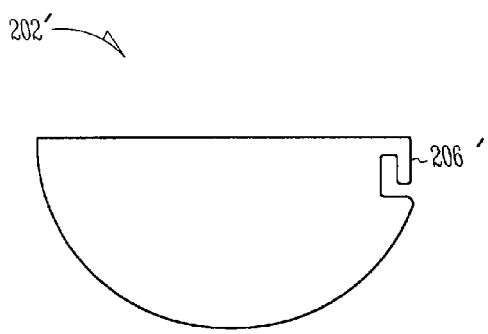
FIG. 3A is a top view of an anode for use in constructing a capacitor according to one embodiment of the present subject matter.
Figure 3B:
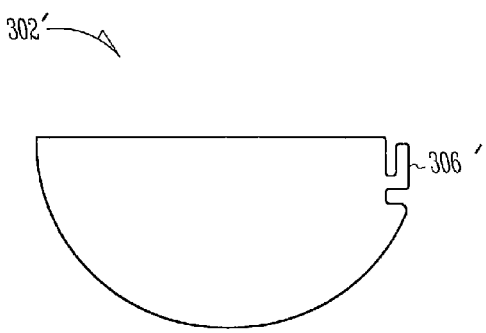
FIG. 3B is a top view of a cathode for use in constructing a capacitor according to one embodiment of the present subject matter.

FIGS. 3A and 3B show an anode 202' and a cathode 302' according to one embodiment of the present subject matter. Anode 202' and cathode 302' are shown before being assembled into capacitor stack 102 as shown in FIG. 1. Anode 202' and cathode 302' are generally similar to anode 202 and cathode 302, respectively, except connection member 206' does not include a cut-out such as cut-out 212 of anode 202 and connection member 306' does not include a cut-out such as cut-out 318 of cathode 302. Various embodiments utilize other shapes and locations for connection members such as connection members 206, 206', 306, and 306'.

For instance, in various embodiments, connection members 206 and 306 may be in different positions along the edges or even within the main body portions of the capacitor foils 202 and 302. For instance, in some embodiments connection members 206 and 306 are located along edges 220 and 320 of the respective electrodes 202 and 302. In some embodiments, the portions are located along curved edges 222 and 322 of the respective electrodes 202 and 302. In various embodiments, the portions may be cut-out within main bodies 204 and 304.

In one embodiment, proximal section 308 of cathode 302 and proximal section 208 of anode 202 are located in different positions (relative to each other) on their respective electrodes, while distal sections 210 and 310 are generally commonly positioned. For instance, in one embodiment connection members 206 and 306 of the anode 202 and the cathode 302, respectively, are mirror images of each other. In some embodiments, connection members 206 and 306 have generally reverse images of each other. In some embodiments, connection members 206 and 306 can have different shapes or sizes relative to each other. For example, the distal portions on either the anode or the cathode can longer or shorter than its opposing distal portion.

Figure 4:
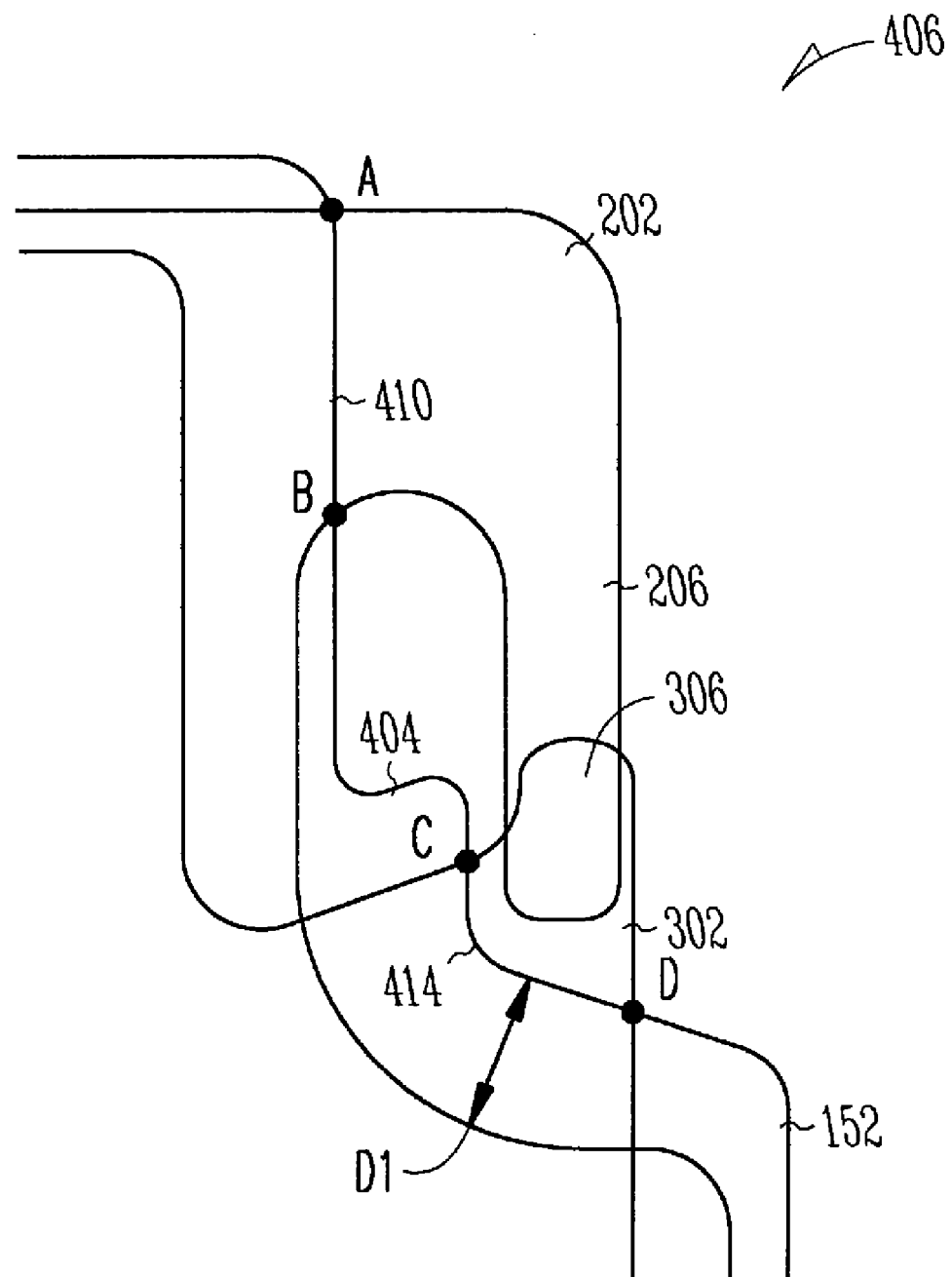
FIG. 4 is a partial top wire frame view of a capacitor stack, according to one embodiment of the present subject matter.

FIG. 4 is a partial top view of a wire frame of a capacitor stack, according to one embodiment of the present subject matter. Illustrated are anode 202, cathode 302, and separator 152. In the wire frame, each line represents a perimeter. While the illustration is not to scale, the size of each component is important relative to the sizes of other components, in various embodiments. The drawing is for explanation purposes, and is not exhaustive or exclusive of shapes and configurations within the scope of the present subject matter.

In various embodiments, the selection of anode/cathode/separator overlap has a functional impact on the capacitor. A separator, in various embodiments, isolates an anode and cathode from direct contact. In additional embodiments, the separator is used as an insulator to discourage breakdown. In various embodiments, breakdown can occur between an anode and a cathode in areas where the combination of proximity of anode and cathode and electric field direction and magnitude encourage breakdown. For example, in one embodiment, breakdown occurs along a path approximated by isolation distance D1. The arc, in one example, travels across separator 152, traveling between anode 202, and cathode 302.

The overall shape of the separator, cathode, and anode are selected, in various embodiments, to reduce instances of breakdown. In one embodiment, the isolation distance D1 is approximately three times the thickness of the separator 152, when measured in a single reference plane parallel to the top view. In other words, anode 202 extends laterally an isolation distance D1 inside of the separator perimeter. In various embodiments, the isolation distance D1 is approximately at least 0.030 inches, when measured in a single reference plane parallel to the top view. In additional embodiments, the isolation distance D1 is from approximately 0.015 inches to approximately 0.045 inches, when measured in a single reference plane parallel to the top view.

Illustrated in FIG. 4 is a second section 410, extending from point A to point B along the perimeter of separator 152, and a first section 414, extending from point C to point D along the perimeter of separator 152. In various embodiments, the cathode 302 extends outside the perimeter of separator 152 laterally along a first section 414. Additionally, in various embodiments, anode 202 extends inside the perimeter of separator 152 along first section 414. Additionally, in various embodiments, the anode 202 extends outside the perimeter of separator 152 laterally along a second section 410. Additionally, in various embodiments, cathode 302 extends inside the perimeter of separator 152 along second section 410.

Additionally pictured is separator protrusion 404, cathode connection member 306, and an anode connection member 206. The separator protrusion 404, in various embodiments, is sized to influence an electrical field affecting connection area 406, due, in part, to the orientation of the anode connection member 206, and the cathode connection member 306. Electrical fields are complex and non-linear in varying capacitor structures. In various embodiments, the shape and orientation of separator protrusion 404 is selected through a process of trial and error or using other processes.

Figure 5:
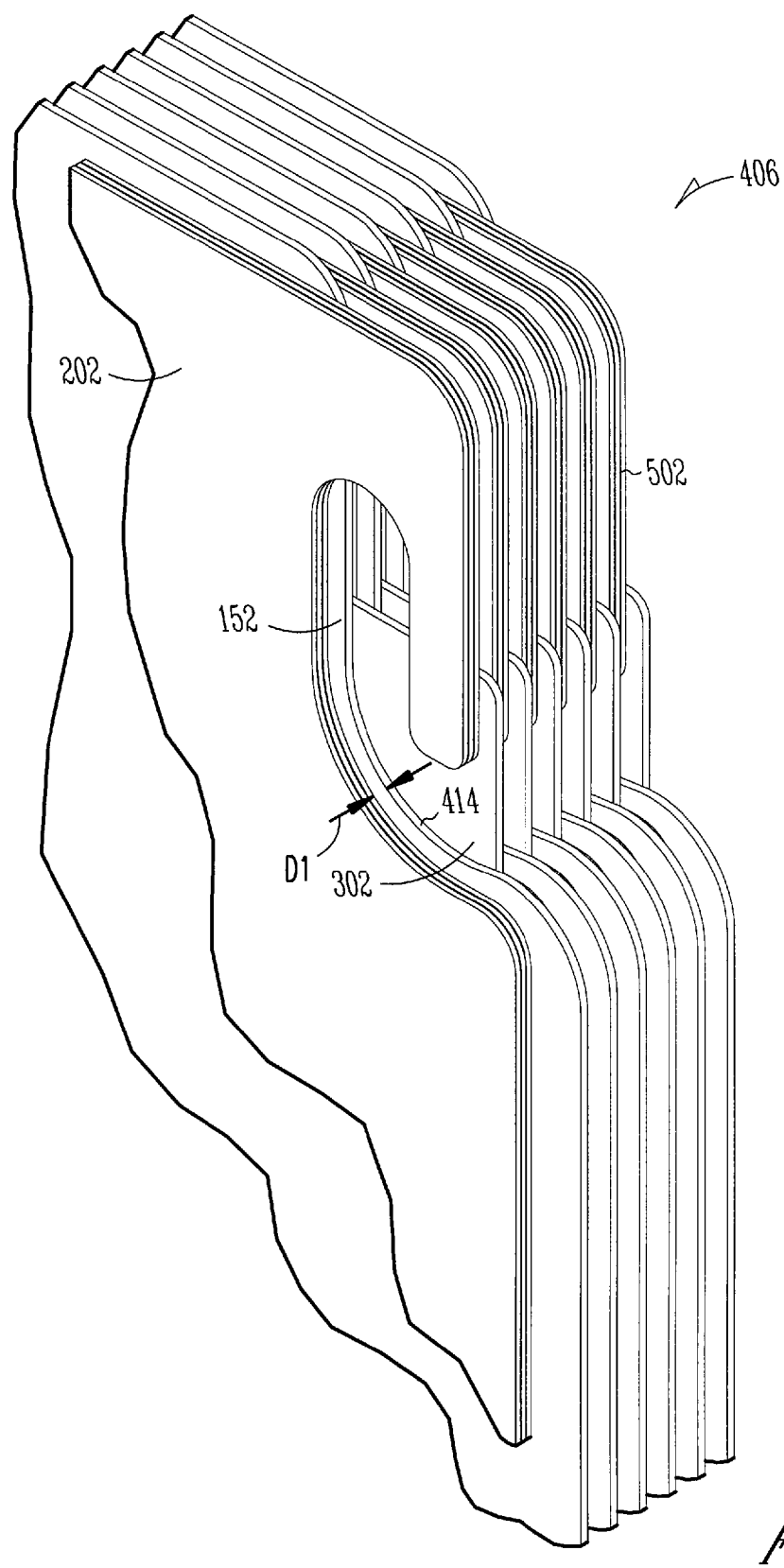
FIG. 5 is a partial perspective view of a capacitor, according to one embodiment of the present subject matter.

FIG. 5 is a partial perspective view of a capacitor, according to one embodiment of the present subject matter. In various embodiments, a capacitor stack is pictured in which an anode 202, and a cathode 302, is separated with separator 152 such that the shortest path between the anode 202 and the cathode 302 is D1. In other words, anode 202 extends laterally an isolation distance D1 inside of the separator perimeter at the first section defined by the distance between points C and D along the separator perimeter. In various embodiments, the isolation distance D1 is at least approximately 0.030 inches, when measured in a single reference plane parallel to the top view. In additional embodiments, the isolation distance D1 is from approximately 0.015 inches to approximately 0.045 inches, when measured in a single reference plane parallel to the top view. In various embodiments, isolation distance D1 is maintained between the anode and the cathode in a connection area 406. In additional embodiments, isolation distance D1 is maintained around the entire perimeter of the capacitor stack.

Additionally illustrated is an anode connection surface 502. In various embodiments, an anode connection surface is useful for connecting a terminal to the anode of the capacitor stack. Terminals within the present subject matter are discussed in related application "Method and Apparatus for Single High Voltage Aluminum Capacitor Design," Ser. No. 60/588,905, filed on Jul. 16, 2004, incorporated herein, as described on or around pages 12-29, 59-60, 63-82 of that application, but the present subject matter is not so limited.

Figure 6:
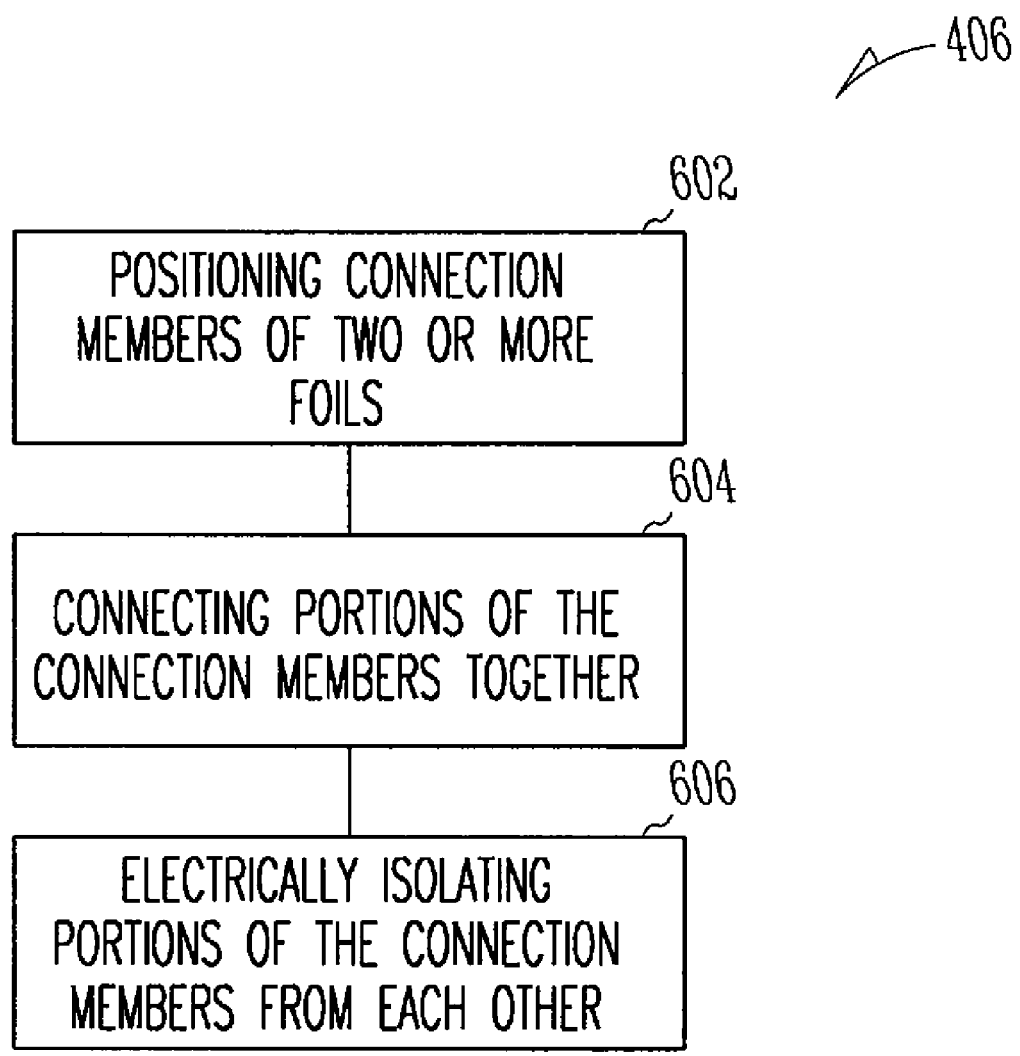
FIG. 6 is a block diagram depicting a method of interconnecting anodes and cathodes of a capacitor according to one embodiment of the present subject matter.

FIG. 6 shows a flowchart depicting a method 600 for interconnecting two or more foils of a capacitor according to one embodiment of the present subject matter. Method 600 includes a block 602, positioning the connection members of two or more foils, a block 604, connecting the connection members, and block 606, electrically isolating portions of the connection members from each other.

In one embodiment, block 602, positioning the connection members of two or more foils, includes stacking an anode foil having a connection member having a proximal section and a distal section upon a cathode foil having a connection member having a proximal section and a distal section. The foils and connection members are positioned so that the proximal section of the anode foil connection member does overlay the proximal section of the cathode foil connection member. In some embodiments, the distal section of the anode foil connection member at least partially overlays the distal section of the cathode foil connection member.

In one embodiment, block 604, connecting the connection members, includes connecting the connection member of the anode foil to the connection member of the cathode foil. In one embodiment, this includes connecting the distal section of the anode connection member and the distal section of the cathode connection member at a portion of the anode connection member that overlays (or underlays) the portion of the cathode connection member. In one embodiment, connecting comprises a single, continuous connection process. For instance, a laser weld or staking process is performed which attaches all the anode and cathode foil connection members together. In various embodiments, this occurs during a single, uninterrupted process. In one embodiment, the connection is performed by edge-welding at least a portion of the distal sections of the anode foil and the cathode foil together. One embodiment includes a laser edge-welding process. Alternatively, in some embodiments, a portion of the stack is welded during a different process or by a different method than the first process. Some embodiments include soldering, staking, swaging, and/or applying an electrically conductive adhesive.

The following description includes aspects of the present subject matter additionally discussed in other portions of this application. Matching numbers help to explain the subject matter, but the arbitrary nature of shapes, such as capacitor electrode shapes, is emphasized, and the matching numbers are not to be taken as limiting. In various embodiments, connection members 206 and 306, pictured in FIGS. 2-3, are laser edge-welded to each other by a process as discussed at column 11, lines 13-36 of "Flat Capacitor Having Staked Foils and Edge-Connected Connection Members," U.S. Pat. No. 6,687,118, filed on Nov. 3, 2000, the specification of which is incorporated here by reference in a nonlimiting sense.

In one embodiment, block 606, electrically isolating portions of the connection members from each other, includes removing portions of the anode connection member and the cathode connection member. In one embodiment, the removed portion includes an area where the cathode connection member overlays (or underlays) a portion of the anode connection member. In one embodiment, this includes removing a portion of the distal sections of the anode connection member and a portion of the distal section of the cathode connection member. In one embodiment, electrically isolating comprises punching-out a portion of the distal section of the anode foil connection member and the distal section of the cathode connection member. In one embodiment, electrically isolating includes laser cutting a portion of the distal section of the anode connection member and a portion of the distal section of the cathode connection member.

After being processed as discussed above in block 606, proximal sections 208 of the connection members of anodes 202 are still coupled to distal sections 310 of the cathodes 302, and proximal sections 308 of the cathode connection members are still connected to distal portion 210 of the anode 203, while anodes 202 and cathodes 302 are electrically isolated from each other. Feedthroughs or other terminal members are used to couple the anodes and cathodes to outside circuitry. Although these examples are useful for demonstrating various aspects of the present subject matter, additional examples fall within this scope.

Figure 7:
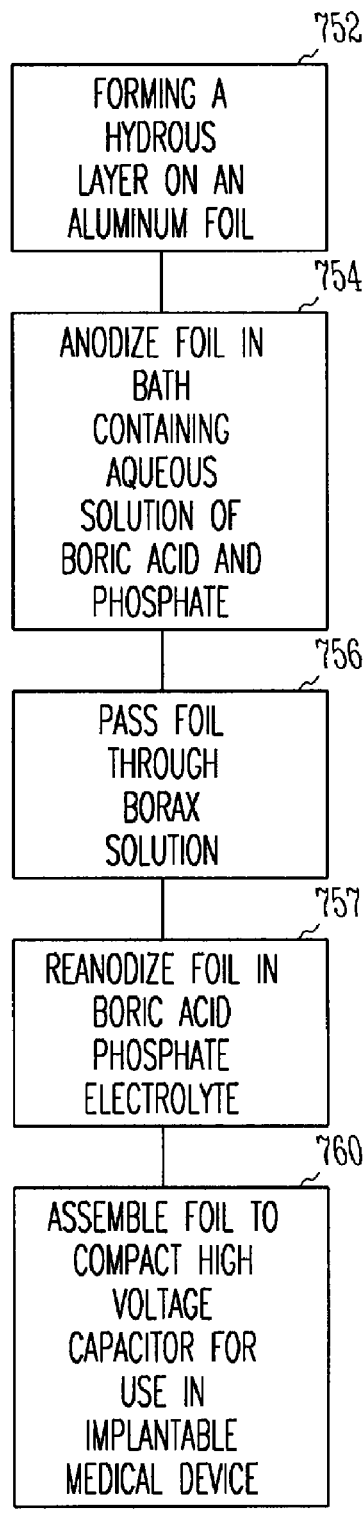
FIG. 7 is a block diagram illustrating an example process for the anodization of an aluminum electrolytic capacitor foil, according to one embodiment of the present subject matter.

FIG. 7 illustrates an example process for the anodization of aluminum electrolytic capacitor foil, according to the present subject matter. In varying embodiments, the present subject matter is capable of producing anodized aluminum electrolytic capacitor foil at a formation voltage from about 200 volts to about 760 volts, which can result in a capacitor with a working voltage from about 150 volts to about 570 volts. For example, the present subject matter encompasses aluminum oxide formed at between approximately 600 volts and approximately 760 volts. Additionally, the present subject matter encompasses embodiments where anodization occurs from about 653 volts to about 720 volts. Additionally, the present subject matter encompasses embodiments wherein anodization occurs from about 667 volts to about 707 volts during formation.

Varied processes can be utilized to produce the aluminum foil of the present subject matter. For example, one process includes forming a hydrous oxide layer on an aluminum foil by immersing the foil in boiling deionized water 752. The aluminum foil is also subjected to electrochemical anodization in a bath containing an anodizing electrolyte 754 composed of an aqueous solution of boric acid, a phosphate, and a reagent. Additionally, the anodizing electrolyte contains a phosphate. In various embodiments, the anodizing electrolyte is at a pH of approximately 4.0 to approximately 6.0. In some examples, the foil is passed through a bath containing a borax solution 756. Borax, in various embodiments, includes a hydrated sodium borate, $Na_2B_4O_7 \times 10H_2O$, and is an ore of boron.

In varying embodiments, the foil is reanodized in the boric acid-phosphate electrolyte previously discussed 758. In various embodiments of the present subject matter, the process produces a stabilized foil suitable for oxide formation of up to approximately 760 volts.

In various embodiments, the anodizing electrolyte used in block 754 and 756 contains about 10 grams per liter to about 120 grams per liter of boric acid and approximately 2 to approximately 50 parts per million phosphate, preferably as phosphoric acid, and sufficient alkaline reagent to lower the resistivity to within approximately 1500 ohm-cm to approximately 3600 ohm-cm and increase the pH from about 4.0 to about 6.0 for best anodization efficiency and foil quality.

In some embodiments, the borax bath contains 0.001 to 0.05 moles/liter of borax. Because the anodizing electrolyte is acidic, in various embodiments, the borax bath is buffered with sodium carbonate to prevent lowering of the pH by dragout of the acidic electrolyte. Additionally, in various embodiments, the borax bath is buffered to lower its resistivity. In one example, the pH of the bath is from about 8.5 to about 9.5, and the temperature is at least approximately 80 degrees Celsius. In varying embodiments, the sodium concentration is approximately 0.005 to approximately 0.05 M, preferably about 0.02 M. It should be noted that concentrations of less than approximately 0.005 M are too dilute to control properly, and concentrations above approximately 0.05 M increase the pH, resulting in a more reactive solution which degrades barrier layer oxide quality.

In varying embodiments of the present subject matter, the presence of at least approximately 2 parts per million phosphate in the acidic anodizing electrolyte is critical. For example, this presence initiates stabilization of the foil so that solely hydrous oxide dissolves in the alkaline borax bath, without damage to the barrier layer dielectric oxide. In varying embodiments, this lowers ESR (equivalent series resistance) of the anodized foil.

Additionally, in various embodiments, when the foil is reanodized following the alkaline borax bath, the foil surface is alkaline and reacts electrochemically with the phosphate, which, in various embodiments, results in the incorporation of phosphate into the dielectric oxide. In varying examples, the alkaline foil surface includes an alkaline metal aluminate, and in one embodiment includes a sodium aluminate. It should be noted that the amount of allowable phosphate in the anodizing electrolyte, in various embodiments, is inversely proportional to the voltage at which the foil is being anodized. For example, in one embodiment, using greater than approximately 24 parts per million results in failure during oxide formation at around 650 volts. In embodiments where approximately 50 parts per million of phosphate is exceeded, the electrolyte scintillates at the foil interface, resulting in damaged, unstable foil. One benefit of the present subject matter is that an electrode is produced which can tolerate a high formation voltage without scintillation at the boundary layer of the foil. It should be noted that anodization temperature should be maintained from about 85 degrees Celsius to about 95 degrees Celsius, as variance outside of these values results in a the barrier layer oxide of lower quality, and foil corrosion.

Various aspects of the present subject matter include performance properties which enable the capacitor to function as a single capacitor in an implantable medical device 760. In one embodiment, an implantable medical device is a cardioverter defibrillator. For example, by constructing the capacitor stack with the methods and apparatus contained in these teachings, one may construct a capacitor which is suited for use as the sole capacitor used for powering therapeutic pulses in an implantable cardioverter defibrillator. By using a single capacitor, instead of two capacitors which are connected in series, the present subject matter contributes to weight and size reductions.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and various embodiments, will be apparent to those of skill in the art upon reviewing the above description. The scope of the present subject matter should be determined with reference to the appended claims, along with the full scope of equivalents to which such claims are entitled.

What is claimed is:

1. An electrolytic capacitor stack disposed in a case, the case filled with electrolyte, the electrolytic capacitor stack comprising:

a substantially planar anode having an anode perimeter and an anode connection member;

a substantially planar separator in alignment with the substantially planar anode, the substantially planar separator having a separator perimeter; and a substantially planar cathode sandwiching the substantially planar separator against the substantially planar anode, the substantially planar anode, the substantially planar cathode, and the substantially planar separator being in alignment, with the anode perimeter extending outside the separator perimeter along a first section of the separator perimeter, the cathode perimeter extending outside the separator perimeter along a second section of the separator perimeter, and the anode and cathode perimeters overlapping outside the separator perimeter at an overlap portion, defining an opening between the overlap portion and the separator perimeter, the opening having at least one acute vertex disposed along the separator perimeter, with the separator perimeter extending outside the anode perimeter and the cathode perimeter along a third section of the separator perimeter which extends at least partially across the opening, wherein along the first section, the separator perimeter is sized such that an electrical isolation distance, sized to resist breakdown, exists between the separator perimeter and the cathode perimeter, and along the second section the separator perimeter is sized such that the electrical isolation distance exists between the separator perimeter and the anode perimeter, and along the third section, the separator is sized to provide the electrical isolation distance across the separator between the anode perimeter and the cathode perimeter.

2. The electrolytic capacitor stack of claim 1, wherein the isolation distance is sized to resist breakdown at between approximately 465 volts and approximately 620 volts.

3. The electrolytic capacitor stack of claim 1, wherein the electrical isolation distance is greater than the stack-wise thickness of the first substantially planar separator.

4. The electrolytic capacitor stack of claim 1, wherein the separator perimeter is laterally disposed outside the cathode perimeter by approximately 0.030 inches along the first section.

5. The electrolytic capacitor stack of claim 1, wherein a packaged capacitor containing the electrolytic capacitor stack is adapted to deliver from about 5.3 joules per cubic centimeter of electrolytic capacitor stack volume to about 6.3 joules per cubic centimeter of electrolytic capacitor stack volume.

6. The electrolytic capacitor stack of claim 1, further comprising:
    a first element having at least the first substantially planar electrode, at least the second substantially planar electrode; and at least the first substantially planar separator; and
    at least a second element, the second element having at least a third substantially planar electrode with a third perimeter, and at least a fourth substantially planar electrode with a fourth perimeter, the third substantially planar electrode and the fourth substantially planar electrode isolated by a second planar separator;
    wherein the first perimeter and the third perimeter are in alignment for electrical connection of the first substantially planar electrode and the third substantially planar electrode; and the first substantially planar electrode and the third substantially planar electrode are connected.

7. The electrolytic capacitor stack of claim 1, wherein the electrolytic capacitor stack is disposed in an implantable medical device.

8. The electrolytic capacitor stack of claim 7, wherein the implantable medical device is an implantable cardioverter defibrillator.

9. An electrolytic capacitor stack disposed in a case, the case filled with electrolyte, the electrolytic capacitor stack comprising:
    a first substantially planar electrode having a first perimeter;
    a second substantially planar electrode in stacked alignment with the first substantially planar electrode having a second perimeter; and
    separator means for electrically isolating, to resist breakdown, the first substantially planar electrode from the second substantially planar electrode, the separator means having a separator perimeter, with the first perimeter extending outside the separator perimeter along a first section of the separator perimeter, the second perimeter extending outside the separator perimeter along a second section of the separator perimeter, and the first and second perimeters overlapping outside the separator perimeter at an overlap portion, defining an opening between the overlap portion and the separator perimeter, the opening having at least one acute vertex disposed along the separator perimeter.

10. The electrolytic capacitor stack of claim 9, wherein the separator means include one or more sheets of paper disposed between the first substantially planar electrode and the second substantially planar electrode.

11. The electrolytic capacitor stack of claim 9, wherein the first substantially planar electrode includes a first perimeter, and the second substantially planar electrode includes a second perimeter, and further comprising protrusion means for electrically isolating, to resist breakdown, the first substantially planar electrode from the second substantially planar electrode along an overlapping intersection of the first perimeter and the second perimeter.

12. The electrolytic capacitor stack of claim 9, wherein along the first section, the separator perimeter is sized such that an electrical isolation distance exists between the separator perimeter and the cathode perimeter, and along the second section the separator perimeter is sized such that the electrical isolation distance exists between the separator perimeter and the anode perimeter, and along the third section, the separator is sized to provide the electrical isolation distance across the separator between the anode perimeter and the cathode perimeter, the isolation distance sized to resist breakdown at between approximately 465 volts and approximately 620 volts.

13. The electrolytic capacitor stack of claim 9, wherein a packaged capacitor containing the electrolytic capacitor stack is adapted to deliver from about 5.3 joules per cubic centimeter of electrolytic capacitor stack volume to about 6.3 joules per cubic centimeter of electrolytic capacitor stack volume.

14. The electrolytic capacitor stack of claim 9, wherein the first substantially planar electrode is an anode, and the second substantially planar electrode is a cathode.

15. The electrolytic capacitor stack of claim 9, wherein the electrolytic capacitor stack is disposed in an implantable medical device.

16. A method of assembling an electrolytic capacitor stack in a case filled with electrolyte, the method comprising:
    stacking a first substantially planar anode into the stack with a second substantially planar electrode;
    positioning a substantially planar separator between the first substantially planar electrode and the second substantially planar electrode;
    aligning the first substantially planar electrode, the second substantially planar electrode, and the substantially planar separator such that a first perimeter of the first substantially planar electrode extends outside a separator perimeter of the substantially planar separator along a first section of the separator perimeter, and a second perimeter of the second substantially planar electrode extends outside the separator perimeter along a second section of the separator perimeter, with the first perimeter and the second perimeter overlapping and defining an opening between an overlap of the first and second perimeter and the separator perimeter, the opening including at least one acute vertex, and with the separator perimeter extending outside the first perimeter and the second perimeter along a third section of the separator perimeter which extends across the opening, with the separation between the first perimeter and the second perimeter across the substantially planar separator being a minimum of an electrical isolation distance along the first section and the second section.

17. The method of claim 16, further comprising cutting the overlap with a laser.

18. The method of claim 16, further comprising cutting the anode with a laser.

19. The method of claim 16, further comprising aligning the first substantially planar electrode, the second substantially planar electrode, and the substantially planar separator such that the separation between the first perimeter and the second perimeter over the substantially planar separator is a minimum of an electrical isolation distance along the third section.

20. The method of claim 16, further comprising repeatedly charging the electrolytic capacitor stack to approximately 465 volts and approximately 620 volts.

* * * * *